US006779249B2

(12) United States Patent
Santini

(10) Patent No.: US 6,779,249 B2
(45) Date of Patent: Aug. 24, 2004

(54) METHOD AND DEVICE FOR DETERMINING IN-PROCESS CHARACTERISTICS OF FABRICATED MAGNETIC HEADS

(75) Inventor: Hugo Alberto Emilio Santini, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 09/815,906

(22) Filed: Mar. 23, 2001

(65) Prior Publication Data

US 2002/0133934 A1 Sep. 26, 2002

(51) Int. Cl.[7] .............................................. G11B 5/127
(52) U.S. Cl. ................................. 29/603.09; 29/603.07; 29/603.13; 29/603.14; 29/603.15; 360/119; 360/122
(58) Field of Search .......................... 29/603.09, 603.1, 29/603.13, 603.14, 603.15, 603.16, 603.07; 360/119, 120, 123, 125, 126, 127, 122

(56) References Cited

U.S. PATENT DOCUMENTS

| | | | | |
|---|---|---|---|---|
| 5,600,880 A | * | 2/1997 | Santini et al. | 29/603.14 |
| 5,621,596 A | * | 4/1997 | Santini | 360/126 |
| 5,652,687 A | * | 7/1997 | Chen et al. | 360/126 |
| 5,793,578 A | * | 8/1998 | Heim et al. | 360/126 |
| 5,802,700 A | * | 9/1998 | Chen et al. | 29/603.14 |
| 5,901,431 A | * | 5/1999 | Santini | 29/603.14 |
| 5,930,084 A | * | 7/1999 | Dovek et al. | 360/321 |
| 6,025,977 A | * | 2/2000 | Hu et al. | 360/319 |
| 6,031,695 A | * | 2/2000 | Hsiao et al. | 360/126 |
| 6,074,566 A | * | 6/2000 | Hsiao et al. | 360/123 |
| 6,104,576 A | * | 8/2000 | Santini | 360/126 |
| 6,111,724 A | * | 8/2000 | Santini | 360/126 |
| 6,130,809 A | * | 10/2000 | Santini | 360/317 |
| 6,156,375 A | * | 12/2000 | Hu et al. | 427/116 |
| 6,172,848 B1 | * | 1/2001 | Santini | 360/126 |
| 6,181,532 B1 | * | 1/2001 | Dovek et al. | 360/321 |
| 6,191,918 B1 | * | 2/2001 | Clarke et al. | 360/126 |
| 6,226,149 B1 | * | 5/2001 | Dill et al. | 29/603.14 |
| 6,239,955 B1 | * | 5/2001 | Dovek et al. | 360/321 |
| 6,338,939 B1 | * | 1/2002 | Clarke et al. | 430/320 |

* cited by examiner

*Primary Examiner*—Ljiljana Ciric
(74) *Attorney, Agent, or Firm*—Robert O. Guillot; Intellectual Property Law Offices

(57) ABSTRACT

A method for determining a characteristic of a magnetic head during its fabrication process on the surface of a wafer substrate. The method involves the fabrication of a test magnetic pole artifact in a field area of the substrate surface adjacent to the actual magnetic pole that is being fabricated. A test pole structure is fabricated simultaneously with, and utilizing the same fabrication conditions and parameters as, the actual pole such that the test pole is nearly identical to the actual pole. During a field etch step undertaken in the fabrication of the actual pole, portions of the test pole structure are removed, leaving a test pole artifact on the wafer surface. The test pole artifact can thus be easily measured as an accurate indication of characteristics of the actual magnetic pole that are difficult to measure directly, thereby saving time and expense in the magnetic head fabrication process. This method is particularly suited to determining the width of the base of the P2 pole tip of a magnetic head, where measurement of the base of the actual magnetic head pole tip is made difficult by the presence of the pole tip, and where the test artifact is easily measured because the test pole tip structure has been etched away, leaving only the artifact for measurement.

46 Claims, 7 Drawing Sheets

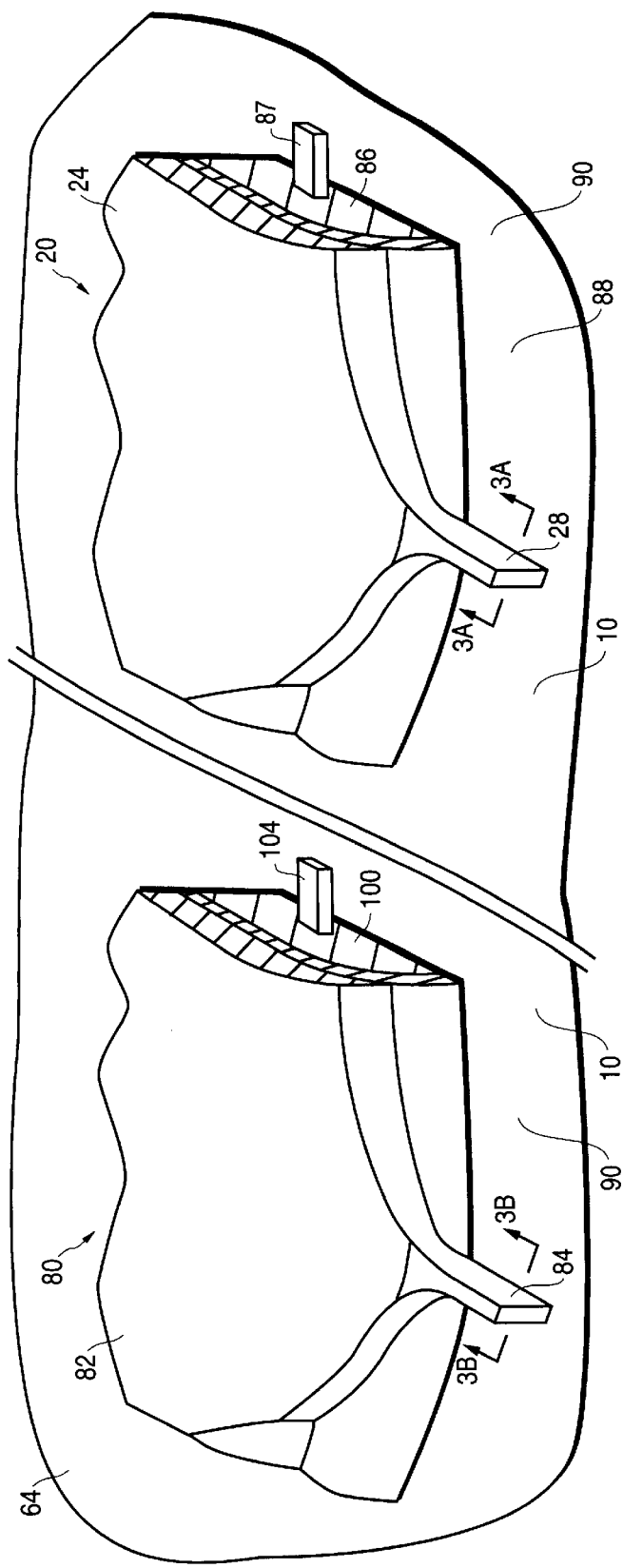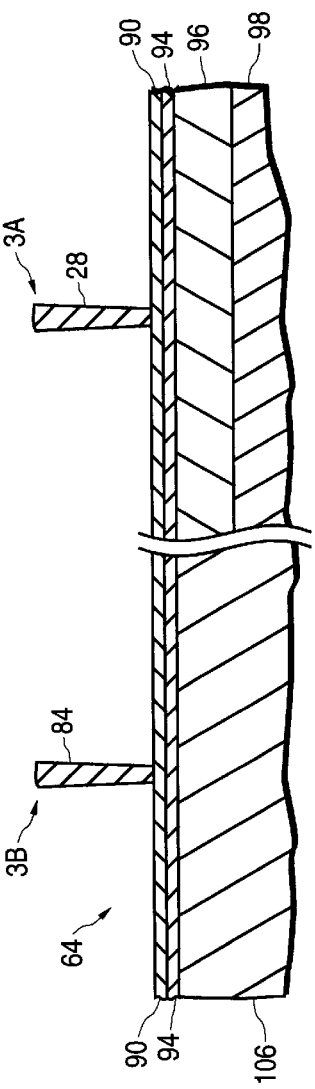
FIG.2
FIG.3

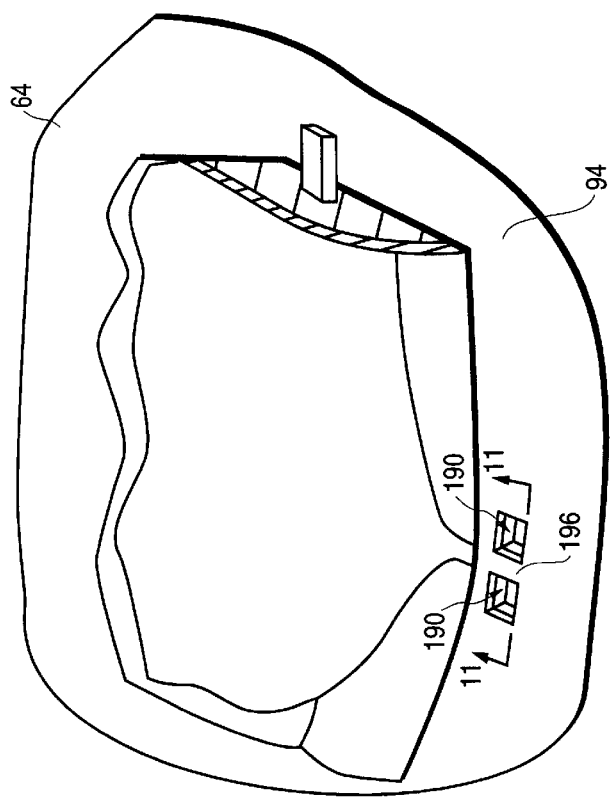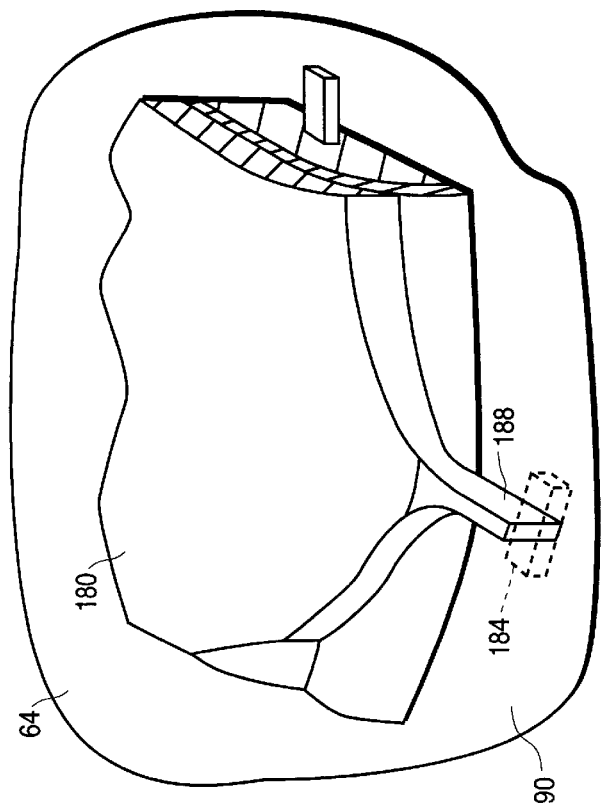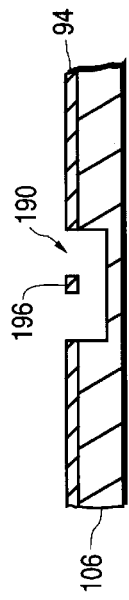

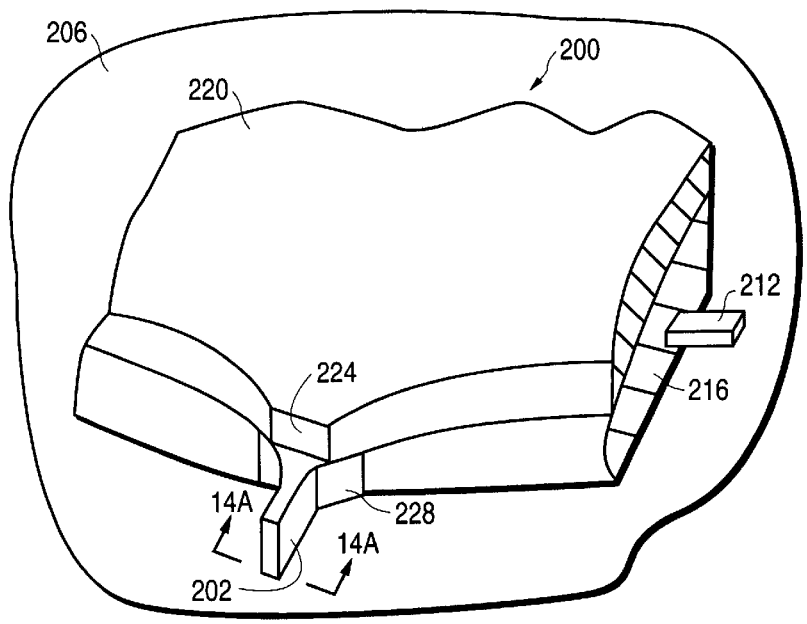
FIG.12
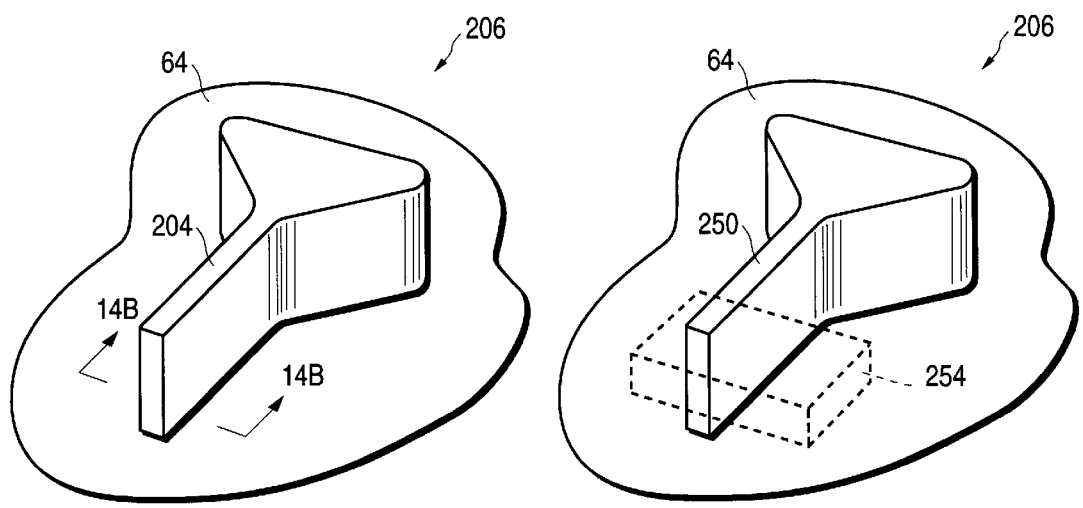
FIG.13  FIG.16

METHOD AND DEVICE FOR DETERMINING IN-PROCESS CHARACTERISTICS OF FABRICATED MAGNETIC HEADS

BACKGROUND OF THE INVENTION

1. Field of the Invention

The present invention relates generally to magnetic head fabrication methods, and more particularly to methods and devices for determining the physical characteristics of magnetic heads during the fabrication thereof, particularly determination of the P2B width of magnetic heads during the fabrication thereof on wafer substrates.

2. Description of the Prior Art

Magnetic heads for hard disk drives are manufactured in large quantities on wafer substrate surfaces, using fabrication methods that are well known to those skilled in the art. One of the most critical dimensions for such magnetic heads is the width of the base of the P2 pole tip (herein termed P2W), because the P2W width generally determines the width of the data track that is written by the magnetic head after it is fabricated and installed in a disk drive device. Therefore, for quality control purposes it is desirable to measure the P2W width of a statistically significant sample of the magnetic heads being fabricated upon the substrate surface following the fabrication of the P2 pole tips. However, the shape of the fabricated P2 pole tip on the substrate substantially screens efforts to measure the P2W width of the pole tip at its base. This is particularly true where the P2 pole tip is fabricated with a larger width at its top portion than at its base, which is generally the case where the pole tip is fabricated utilizing photolithographic techniques. Because the top of the pole tip is wider than the pole tip base, a top down scanning electron microscope (SEM) cannot accurately measure the base width (the P2W width), and SEM measurements are therefore currently made at an oblique angle. These oblique P2W width measurements are time-consuming, expensive and can only be performed on a small statistical sample of the many magnetic heads fabricated on the wafer surface. The present invention solves this problem by fabricating a test P2 pole tip in the kerf, or saw cut, regions of the wafer surface in a manner that allows unobstructed top down SEM measurement of the test P2 pole tip base. Because the test pole tip is fabricated immediately next to the actual magnetic head, and because it is fabricated with the same materials, conditions and topology as the actual magnetic head, the measurement of the width of the test pole tip base constitutes an accurate P2W measurement of the base of the actual P2 pole tip of the magnetic head.

SUMMARY OF THE INVENTION

The present invention is a method for determining a characteristic of a magnetic head during its fabrication process on the surface of a wafer substrate. The method involves the fabrication of a test magnetic pole artifact in a field area of the substrate surface adjacent to the actual magnetic pole that is being fabricated. A test pole structure is fabricated simultaneously with the actual pole utilizing the same fabrication conditions and parameters, such that the test pole is nearly identical to the actual pole. During a field etch step undertaken in the fabrication of the actual pole, portions of the test pole structure are removed, leaving a test pole artifact on the wafer surface. The test pole artifact can be easily measured as an accurate indication of characteristics of the actual magnetic pole that are difficult to measure directly, thereby saving time and expense in the magnetic head fabrication process. The present invention is particularly suited to determining the width of the base of the P2 pole tip of a magnetic head, where a measurement of the base of the actual magnetic head pole tip is made difficult by the presence of the pole tip, and the test artifact is easily measured because the test pole tip structure has been etched away, leaving only the artifact for measurement, as a determination of the width of the base of the P2 pole tip of the magnetic head. A plurality of test pole structures can be fabricated upon various portions of the surface of the wafer to provide measurements from the various portions of the surface, whereby such problems as phototool distortion, wafer and chuck flatness, resist coating non-uniformities and the like can be determined.

It is an advantage of the magnetic head fabrication method of the present invention that a characteristic of a magnetic head can be determined indirectly while the head is disposed on a substrate surface during the fabrication process.

It is another advantage of the magnetic head fabrication method of the present invention that a characteristic of a magnetic head can be determined by measurement of a test device fabricated proximate the magnetic head upon the surface of a substrate.

It is a further advantage of the magnetic head fabrication method of the present invention that the width of the base of a P2 pole tip of the magnetic head can be determined rapidly and inexpensively.

It is yet another advantage of the magnetic head fabrication method of the present invention that a test magnetic pole structure is fabricated proximate the actual magnetic head under identical process conditions, such that a pole tip of the test magnetic pole structure is nearly identical to the pole tip of the actual magnetic head.

It is yet a further advantage of the magnetic head fabrication method of the present invention that a test magnetic pole tip structure is fabricated proximate an actual magnetic P2 pole tip, and that the test pole tip is removed during a process step to leave a test artifact that is easily and inexpensively measured as an indication of the base width of the P2 pole tip.

It is still a further advantage of the method for fabricating a magnetic head of the present invention that a plurality of test magnetic pole structures can be fabricated at various locations on the surface of a substrate, such that phototool distortion, wafer and chuck flatness, resist coating non-uniformities and the like can be determined.

These and other features and advantages of the present invention will no doubt become apparent to those skilled in the art upon reading the following detailed description which makes reference to the several figures of the drawings.

IN THE DRAWINGS

FIG. 2 is a broken perspective view depicting a magnetic head and a test magnetic pole structure of FIG. 1;

FIG. 3 is a broken cross-sectional view depicting the P2 pole tip and the test pole tip of the magnetic head and test magnetic pole structure depicted in FIG. 2;

FIGS. 9, 10 and 11 depict process steps in the fabrication of another embodiment of a test pole tip of the present invention;

FIG. 12 is a broken perspective view depicting an alternative magnetic head structure including a separately fabricated P2 pole piece;

FIG. 13 is a perspective view of a separate test pole piece that is similar to the separate P2 pole piece depicted in FIG. 12; and which is fabricated in a kerf area of a wafer substrate;

FIG. 16 is a perspective view depicting an alternative test P2 pole piece having a P1 plug fabricated therebeneath in a wafer kerf area.

DETAILED DESCRIPTION OF THE PREFERRED EMBODIMENTS

Magnetic heads are fabricated in large quantities upon the surface of a substrate in a fabrication process that includes many process steps. A critical parameter of the magnetic heads is the width of the base of the P2 pole tip (termed the P2W width), and a measurement of the P2W width conducted promptly following the fabrication of the P2 pole tip can save significant ongoing fabrication time and expense where the width measurement is unacceptable. However, measurement of the P2W width is made difficult by the physical presence of the P2 pole tip itself. The present invention involves the fabrication of a test pole tip structure in field areas of the substrate, followed by removal of portions of the test pole tip, such that a test artifact remains on the substrate surface that provides an accurate indication of the P2W width. The test artifact can be easily measured in a top down manner because the test pole tip has been removed. A detailed description of the present invention is next provided.

Figure 1:
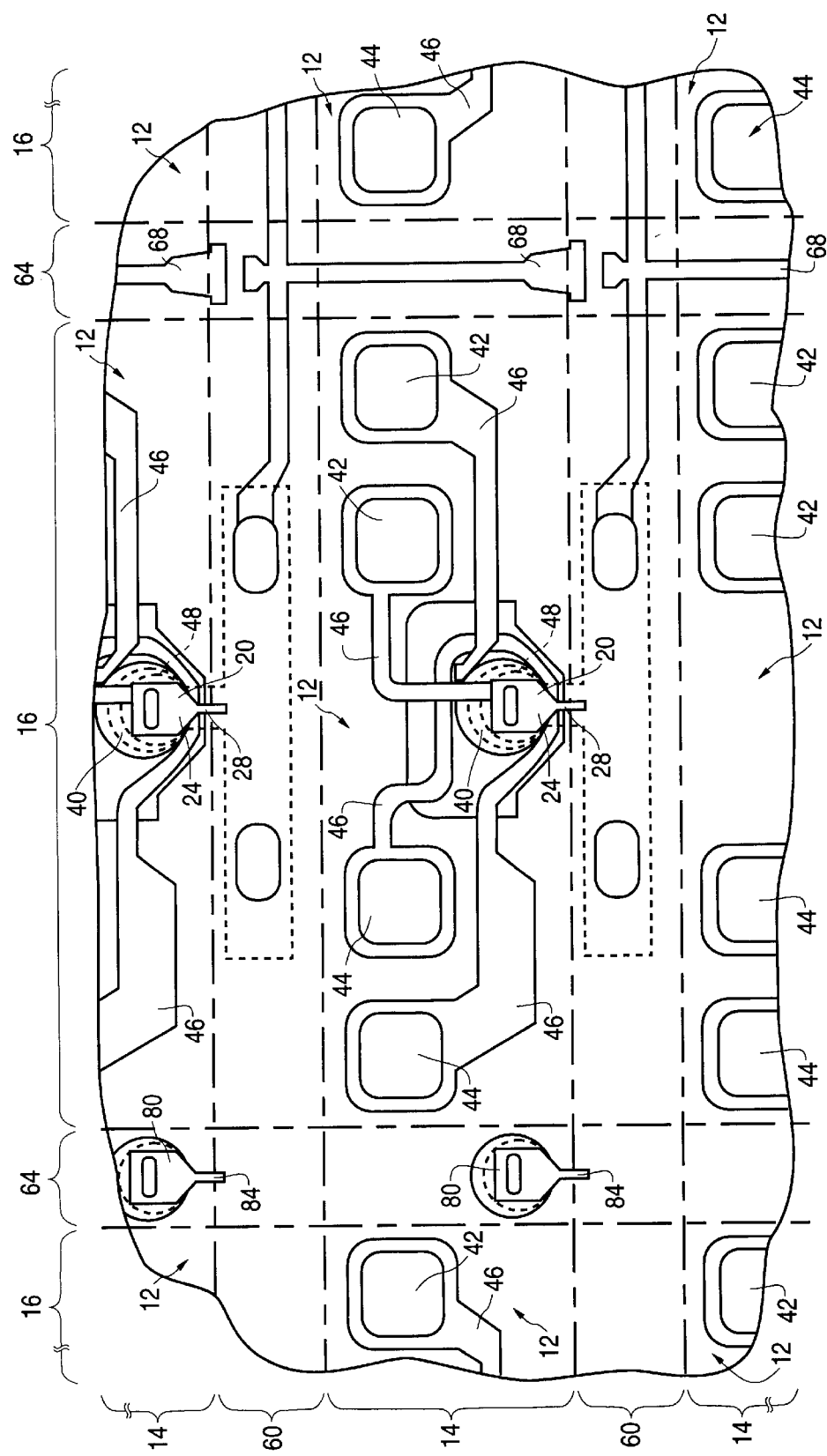
FIG. 1 is a top plan view of a wafer substrate surface depicting the fabrication of a magnetic head, and including a test magnetic pole structure of the present invention.

FIG. 1 is a top plan view of a wafer substrate surface 10 that depicts the significant features of a plurality of magnetic heads 12 that are being fabricated on the surface 10. The magnetic heads 12 are arranged in horizontal rows 14 and vertical columns 16 upon the surface 10. Pertinent to the present invention, each of the magnetic heads 12 includes a P2 pole 20, that has a yoke portion 24 and a P2 pole tip portion 28. Other significant magnetic head components depicted in FIG. 1 include a generally circular induction coil area 40 having a spiral induction coil (not shown), formed therebelow, electrical contact pads 42 for the induction coil and electrical contact pads 44 for a read head element (not shown) that is disposed beneath the P2 pole tip 28, together with electrical lead lines 46 from the contact pads 42 and 44 to the induction coil and read head element. A horizontal kerf saw cutting zone 60 exists between each horizontal row 14 of magnetic heads, and a vertical kerf saw cutting zone 64 exists between each vertical column 16 of magnetic heads. An electrical lapping guide (ELG) 68 may be formed in some of the vertical kerf regions 64 to provide electrical guidance signals during a subsequent lapping step that forms the air bearing surface (ABS) of the device. All of these magnetic head and wafer surface structures and features are well known to those skilled in the prior art.

As indicated hereabove, it is desirable to measure the width (P2W) of the base of the P2 pole tip 28, however efforts to measure the width of the base of the P2 pole tip 28 are inhibited by the presence of the fabricated pole tip itself, which generally is wider at its top than its base, such that top down scanning electron microscope (SEM) measurement is inhibited and oblique SEM measurement must typically be performed.

As is described in detail below with the aid of FIG. 2, a significant feature of the present invention is the fabrication of a test magnetic head structure 80, specifically including a test P2 pole tip 84, in many of the vertical kerf regions 64. Such a test head structure 80 can be fabricated in the vertical kerf regions 64 in an alternating pattern with the ELG device that is also fabricated in kerf regions 64. Therefore, a plurality of test head structures 80, as many as half of the total magnetic heads can be fabricated throughout the surface of the wafer. As is described hereinbelow in detail, these test head structures 80 are fabricated such that they are significantly more easily measured than are the P2 pole tips 28, and the measurement provides an accurate indication of the P2W width of the base of the pole tips 28. Measurement of the width of the test pole tips 84 of the test magnetic head structures 80 at various locations on the wafer surface 10, can not only provide significant information regarding the magnetic heads 12, but can also identify and quantify such problems as phototool distortions, wafer and chuck flatness, resist coating non-uniformities and other process parameters. A detailed description of the fabrication and measurement techniques of the present invention is next provided.

FIG. 2 is a broken perspective view of the pole portions 20 and 80 of FIG. 1 depicting both a fabricated P2 pole 20 (including a yoke portion 24 and a pole tip 28) and a test pole structure 80 (including a yoke portion 82 and a test pole tip portion 84), and FIG. 3 is a broken cross sectional view of the P2 pole tip 28 taken along lines 3A—3A of FIG. 2 and the test pole tip 84 taken along lines 3B—3B of FIG. 2. FIGS. 2 and 3 depict the fabrication step following the removal of the patterned photoresist that was used to electroplate the pole portions 20 and 80, as is well understood by those skilled in the art. As depicted in FIGS. 2 and 3, the yoke portion 24 of the actual P2 pole 20 is fabricated upon a raised topology 86 above induction coil members 87, as compared to the pole tip 28 that is formed on a relatively flat topology 88. As is well known to those skilled in the art, the P2 pole 20, including the pole tip 28 is fabricated upon a seed layer 90 which is deposited upon a write gap layer 94. The write gap layer 94 is fabricated upon a P1 magnetic pole 96 which has been formed upon an insulation layer 98 that is deposited above a read head portion (not shown) of the magnetic head 12.

The test pole structure 80 is fabricated at the same time and using the same fabrication steps as the actual magnetic pole 20; thus the test pole structure 80 is nearly identical to the actual P2 pole 20, including the near identity of the test pole tip 84 to the actual P2 pole tip 28. This identity of structures is significant and purposeful. Specifically, the test pole 80 is fabricated upon a raised topology 100 including partial induction coil members 104. The test pole tip 84 is fabricated on a relatively flat seed layer 90 above the write gap layer 94 that were deposited upon the wafer surface as part of the fabrication of the magnetic heads 12. However, while the P2 pole tip 28 is fabricated above the P1 pole layer 96 of the magnetic head 12, the test pole tip 84 is fabricated above the substrate material 106 in the kerf area 64 of the wafer surface 10. Further fabrication steps are next discussed.

Figure 4:
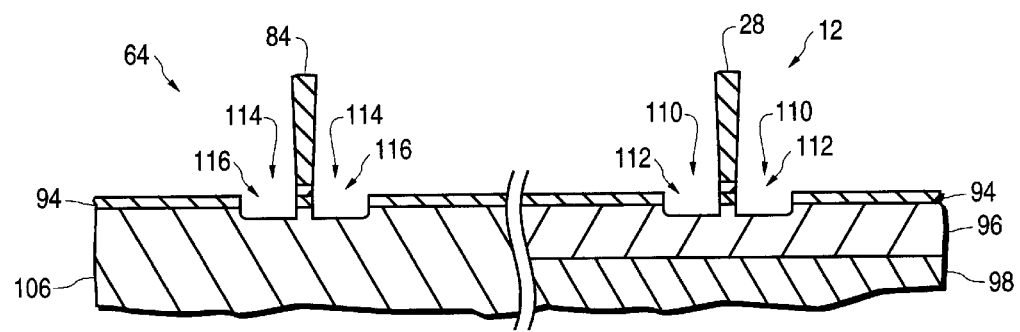
FIGS. 4 and 5 depict further process steps in the fabrication of the P2 pole tip and test pole tip.

FIG. 4 is a broken cross-sectional view of the pole tip 28 and test pole tip 84 following a subsequent P1 pole notching fabrication step. Initially, with reference to FIG. 3, the seed layer 90 is removed from the wafer surface in a sputter etching or ion milling step. Then, in a P1 pole notching process as is well known to those skilled in the art, a patterned etching mask (not shown) is deposited upon the substrate surface 10, such that the P2 pole tip 28 and wafer surface areas 110 immediately adjacent to the P2 pole tip 28 are uncovered. A corresponding patterned mask is formed at the test pole tip 84. That is, the patterned mask (not shown) is designed to leave the test pole tip 84 and wafer surface areas 114 immediately adjacent to the test pole tip 84 uncovered. Thereafter, a sputter etching or ion milling step is conducted which removes material in the uncovered areas 110 including the portions of the write gap layer 94 and portions of the P1 pole layer 96. The material removal process also occurs in the exposed (uncovered) areas 114, and portions of the write gap layer 94 and the wafer substrate 106 of the kerf area 64 adjacent to the test pole tip 84 are removed. Thereafter, the mask (not shown) is removed such that the P1 pole notched areas 112 and the test pole tip notches 116 depicted in FIG. 4 remain.

Figure 5:
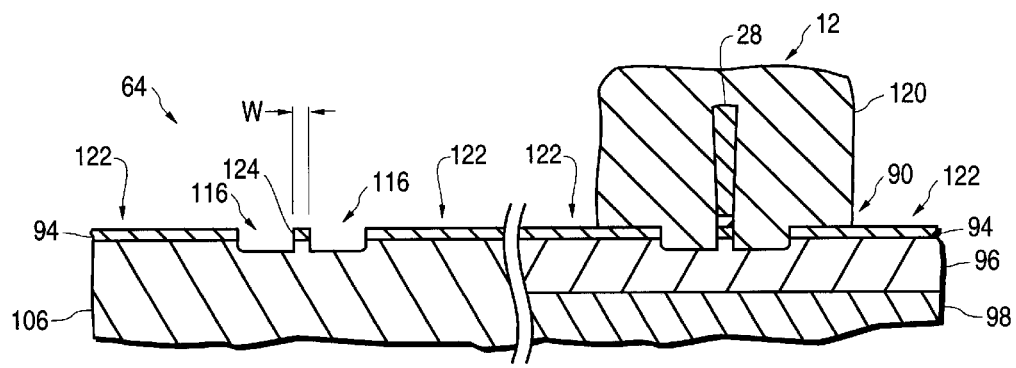

Subsequent steps in the fabrication of the magnetic heads 12 are depicted in FIG. 5 which is a broken cross-sectional view of the pole tip 28 and the kerf area 64 of the test pole tip 84. As depicted in FIG. 5, a next step in the fabrication of the actual magnetic head 12 is the removal of any field located plated material (not shown) from the wafer surface in areas away from the magnetic heads 12. The removal of the plated field material is accomplished by first covering the magnetic heads 12, including the P2 pole 20 and pole tip 28 with a suitable patterned resist 120, and then chemically field etching the plated field material from all areas 122 of the wafer field that are not covered by the patterned resist 120. Significantly, the test pole structure 80, specifically including the test pole tip 84 is not covered by the patterned resist 120, such that the entire test pole structure 80, and specifically including the test pole tip 84 is removed from the kerf area 64 during the chemical field etch step. When the test pole tip 84 is removed by the field etch step, a write gap layer pedestal 124 remains and it is distinguishable from the remaining write gap layer 94 due to the notching 116 that was previously performed. This pedestal 124 remains as a test pole artifact on the wafer surface 10. It is now to be understood that the width w of the pedestal 124 depicted in FIG. 5 is an accurate image of the width of the base of the test pole tip 84. Accurate measurement of the width w of the pedestal 124 can now be easily and rapidly accomplished utilizing a top down SEM measurement technique.

Furthermore, because the test pole tip 84 was fabricated identically with the actual P2 pole tip 28 of the magnetic head 12, including the same materials and process conditions, and including the fabrication of a test pole yoke portion 82 with its topology 100, the measurement of the width w of the pedestal 124 constitutes an accurate representative measurement of the P2W width at the base of the P2 pole tip 28. Additionally, because the test pole structures 80, and therefore the fabricated pedestals 124, are formed at every other magnetic head location throughout the wafer surface 10, the measurement of the test pole tip width w can be easily and rapidly determined throughout all areas of the wafer surface. The time and expense of further fabrication steps can now be avoided where the overall test pole tip dimension w is unacceptable, thereby indicating that the P2W width of the actual pole tips 28 is unacceptable. Additionally, such problems as phototool distortions, wafer and chuck flatness, resist coating non-uniformities and the like can be determined by comparing the test pole tip width w measurements that are taken in different areas of the wafer surface.

Figure 6:
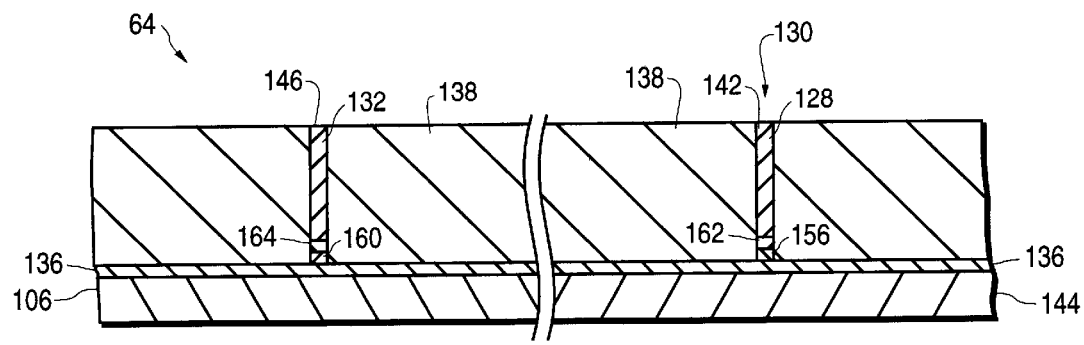
FIGS. 6, 7 and 8 are broken cross-sectional views depicting process steps in the fabrication of an alternative magnetic head P2 pole tip and test pole tip.

The fabrication of the test pole structure 80 within the kerf portion 64 of the wafer surface is generally applicable to other types of magnetic head fabrication techniques that are known in the industry. For instance, FIG. 6 is a broken cross-sectional view of a pole tip 128 of a magnetic head 130 and a test pole tip 132 of a test artifact 134, wherein the view of FIG. 6 is similar to those of FIGS. 3, 4 and 5. The significant difference between the fabricated pole tip 128 as depicted in FIG. 6 and the fabricated pole tip 28 of the magnetic head 12 depicted in FIGS. 3–5 and described hereabove, is that the fabrication of the pole tip 128 is accomplished utilizing a plated write gap fabrication process, as is known to those skilled in the art, rather than the deposited write gap layer as described hereabove. Specifically, in a plated write gap fabrication process, following the fabrication of the P1 pole 144 an electroplating seed layer 136, such as FeN, is deposited upon the surface of the wafer, including the surface of the P1 pole 144 of the magnetic head 130, and on the substrate surface 106 in the kerf area 64 where the test pole tip 132 is to be fabricated. Thereafter, utilizing photolithographic techniques, a patterned photoresist 138 is fabricated to create electroplating trenches 142 and 146 for the pole tips 128 and 132, respectively. A P1 pedestal piece 156 and 160 respectively may be next plated up on the seed layer 136 within the trenches 142 and 146 respectively. The P1 pedestal 156 will provide reduced side writing of the magnetic head 130, and the P1 pedestal piece 160 will provide increased discrimination for the test pole piece artifact, as is described herebelow. A plated write gap layer 162, typically comprised of NiP, is plated onto the P1 pedestal 156 in the trench 142 where the actual P2 pole tip 128 will be fabricated, and an identical NiP plated write gap layer 164 is simultaneously fabricated upon the P1 pedestal 160 in the trench 146 of the test pole tip 132. Thereafter, the P2 pole of the magnetic head 130, including the P2 pole tip 128, is plated onto the NiP write gap layer 162 of the magnetic head, and a test structure pole with its test pole tip 132 is simultaneously plated onto the write gap layer 164 at the kerf 64 location of the test device.

Figure 7:
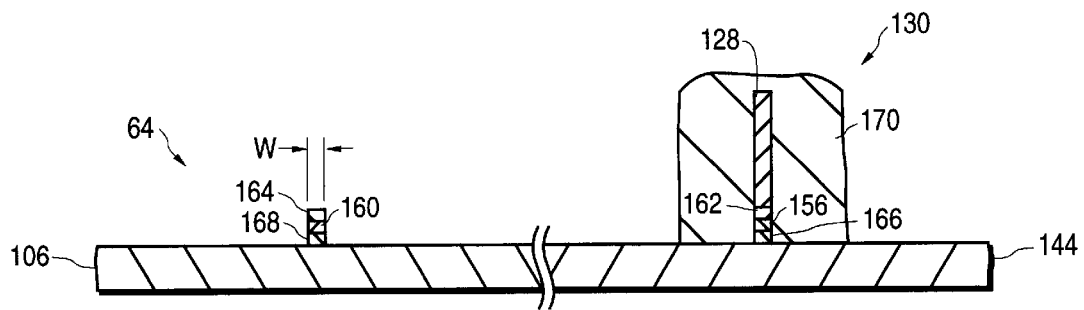
Figure 8:
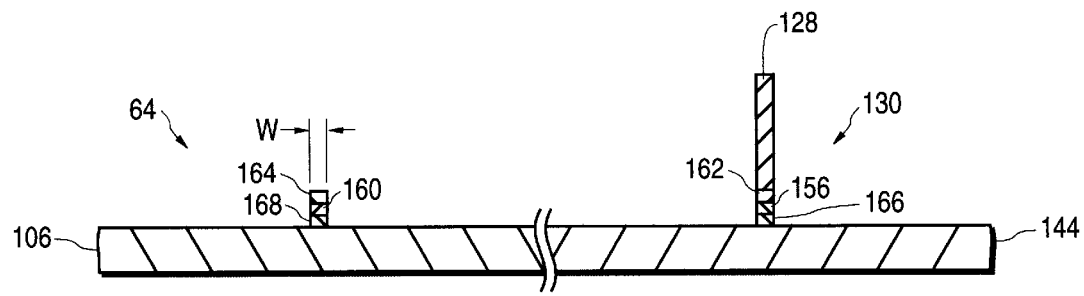

It is therefore to be realized that at this fabrication step the actual P2 pole, including the pole tip 128, is formed, and a similar test pole structure, including a test pole tip 132 is also formed. Subsequently, as depicted in FIG. 7, the photoresist 138 is removed and the exposed seed layer 136 is removed in a sputter etching or ion milling step, such that only the small seed layer pieces 166 and 168 remain beneath the P1 pedestal pieces 156 and 160 respectively. A patterned resist layer 170 is next fabricated to cover and protect the actual magnetic head pole tip 128, while the test pole tip 132 is uncovered and thus not protected by the patterned resist layer 170. A chemical field etch step is next conducted in which the actual magnetic head pole tip 128 is protected by the patterned resist layer 170, and in which the test pole tip 132 and any field plated pole material (not shown) is not protected. The field etch step removes the test pole tip 132 and any field plated pole material. The plated NiP write gap piece 164 with the P1 pedestal piece 160 beneath it and the protected FeN seed layer piece 168 remain. Thereafter, as depicted in FIG. 8, the protective photoresist layer 170 is removed. Thus, the remaining test artifact 174 includes the NiP write gap piece 164, the P1 pedestal piece 160 and the seed layer piece 168 disposed beneath the P1 pedestal piece 160. At this point, the width w of the remaining plated test artifact 174 is an accurate representation of the P2W width of the base of the P2 pole tip 128, and a top down SEM measurement of the test artifact 174 width w provides an accurate measurement of the P2W width of the fabricated pole tip 128 of the magnetic head 130.

FIG. 9 is a perspective view of the test device kerf location 64 depicting an alternative test pole structure 180 fabricated for enhanced contrast for SEM measurement of the test artifact width w. In comparing the test pole structure 180 of FIG. 9 with test pole structure 80 of FIG. 2 (described hereabove), the significant difference is that a plug 184 of P1 pole material is formed beneath the test pole tip 188 of the test pole structure 180. However, the wafer fabrication step depicted in FIG. 9 is substantially identical to that depicted in FIG. 2. That is, the wafer includes the seed layer 90 that remains on the surface of the wafer prior to the sputter etching or ion milling of the seed layer as depicted in FIGS. 2 and 3 and described above.

To fabricate the test pole structure 180 depicted in FIG. 9 the small plug 184 of P1 magnetic pole material is fabricated in the location of the test pole tip 188 during the P1 pole fabrication step of the magnetic head 12. The plug 184 is fabricated in the test pole tip location by altering the photolithographic mask that is utilized to form the P1 pole, such that a small test plug photoresist cavity (not shown) is formed in the photoresist layer (not shown) that is utilized to form the P1 magnetic pole. Thereafter, when the P1 pole is electroplated in forming the magnetic head 12, the plug 184 of P1 pole material is likewise plated into its photoresist cavity. The write gap layer 94 (see FIG. 10 described below) is subsequently deposited on top of the plug 184, just as it is deposited on top of the P1 pole; the seed layer 90 is then deposited and the test device pole tip 188 is fabricated on top of the seed layer 90 above the plug 184, in the same fabrication steps that are conducted to fabricate the P2 pole 28 of the magnetic heads, as described hereabove. The seed layer 90 is then removed in a sputter etching or ion milling step, and P1 notching then is conducted through the write gap layer 94, as was depicted in FIG. 4 and described above. The plug 184 is exposed and milled in the notching around the test pole tip 188.

Thereafter, the chemical field etch step is undertaken, as is depicted in FIGS. 10 and 11, wherein FIG. 10 is a perspective view of the kerf area 64 following the field etching step, and FIG. 11 is a side cross sectional view of the remaining test pole artifact 196 taken along lines 11—11 of FIG. 10. When the chemical field etch step is undertaken, the chemical etchant removes the unprotected test pole structure 180, including the test pole tip 188, and the etchant also attacks and removes the unprotected plug material 184 thus creating a cavity 190. Because the field etch does not attack the write gap layer material 94, while it does attack the test P2 pole tip 188 and the plug material 184, the write gap layer remains as a test artifact bridge 196 across the etched plug cavity 190, as depicted in FIGS. 10 and 11. The width W of the bridge 196 is an accurate representation of the width of the base of the test pole tip 188, and thus accurately represents the P2W width of the actual pole tip. Typically, the write gap layer 94 may have a thickness of approximately 0.2 microns, whereas the plug cavity 190 will have a depth of approximately 2 microns, such that an SEM determination of the width w of the write gap material test artifact 196 will have significantly enhanced contrast.

Figure 14:
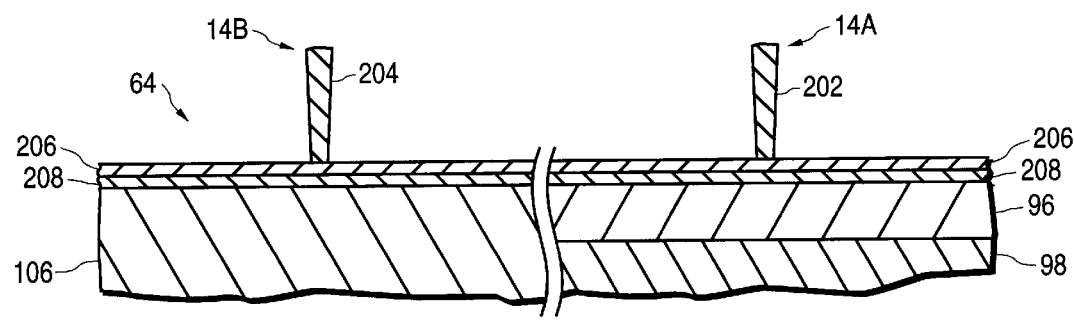
FIG. 14 is a side cross-sectional view of the pole tip pieces depicted in FIGS. 12 and 13, taken along lines 14A—14A and 14B—14B respectively of FIGS. 12 and 13.

FIG. 12 is a broken perspective view depicting an alternative magnetic head structure 200 including a separately fabricated P2 pole tip piece 202, FIG. 13 is a perspective view depicting a separate test P2 pole tip piece 204 that is similar to the P2 pole tip piece 202 part of the magnetic head 200 depicted in FIG. 12, and FIG. 14 is a side cross-sectional view of pole tip pieces 202 and 204 taken along lines 14A—14A and 14B—14B respectively of FIGS. 12 and 13. With reference to FIG. 12, the pole tip piece 202 is generally fabricated as a separate piece upon a seed layer 206 that is deposited upon a write gap layer 208 (See FIG. 14). Thereafter, the induction coil 212 of the magnetic head 200 is fabricated in an insulation layer 216 that is generally as thick as the P2 pole piece 202. Thereafter, a separate P2 pole yoke piece 220 (sometimes referred to as a P3 pole) is fabricated on top of the insulation layer 216, such that a narrowed portion 224 of the P3 pole 220 is magnetically connected with a widened portion 228 of the pole piece 202, such that magnetic flux generated within the P3 pole 220 will flow into the P2 pole piece 202. It is therefore to be understood that the fabrication of the magnetic head 200 proceeds with the initial fabrication of the P2 pole piece 202 upon the flat seed layer 206. With reference to FIGS. 13 and 14 and in accordance with the present invention as described hereabove, a separate test pole piece 204 similar to the P2 pole piece 202, is fabricated upon the seed layer 206 in the kerf area 64 of the wafer substrate between magnetic heads. Therefore, and with reference to FIG. 14, a cross-sectional view of the pole tip piece 202 of the magnetic head 200, taken along lines 14A—14A will appear identical to P2 pole tip 28 of FIG. 3, and a cross-sectional view of a kerf located test pole tip piece 204 taken along lines 14B—14B, will appear identical to the test pole tip 84 depicted in FIG. 3.

Figure 15:
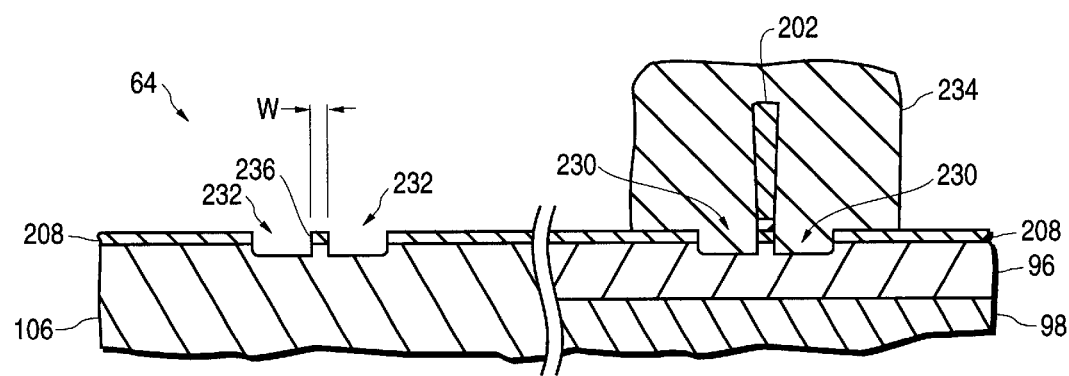
FIG. 15 is a side cross-sectional view taken along the lines of FIG. 14, depicting the pole piece and test artifact following P1 pole notching and the chemical field etch step.

The fabrication steps to create a test artifact from the kerf area located test pole tip 204 depicted in FIGS. 13 and 14, are therefore substantially identical to the fabrication steps described hereinabove with regard to test pole tip 84, as depicted in FIGS. 4 and 5, which ultimately result in the fabrication of the test artifact. Specifically, following the fabrication of the pole tip pieces 202 and 204 the seed layer 206 is removed in a sputter etching or ion milling process. Thereafter, as depicted in FIG. 15, a P1 notching step is conducted wherein a patterned photoresist layer 234 is fabricated in a manner that leaves both pole tip pieces 202 and 204 uncovered, such that P1 notches 230 and 232 are formed proximate the pole tip pieces 202 and 204 respectively. Thereafter, the P2 pole tip piece 202 is covered by a patterned photoresist layer (not shown) while the test pole tip piece 204 is left uncovered, and a chemical field etch is then conducted in which the test pole tip piece 204 is etched away, while the protected P2 pole tip piece 202 remains, as is depicted in FIG. 15. The test artifact 236 remains where the test pole tip piece 204 was etched away. The width w of the test artifact 236 is substantially identical to the (P2W) width of the base of the P2 pole tip piece 202. It will therefore be understood that an advantage of the present invention, when applied to the fabrication of magnetic heads 200, is that the P2W pole tip width of a particular head can be determined following the fabrication of the P2 pole tip piece 202 which is prior to the fabrication steps required to create the induction coil and P3 pole piece. Thus, where testing of the width w of the test artifact 236 of the test pole tip piece 204 reveals that the P2W width of a wafer's fabricated pole tip pieces 202 are not within design parameters, the fabrication process for the wafer can be halted at that point, thus saving the time and materials required to fabricate the induction coil and P3 pole piece.

FIG. 16 depicts a test P2 pole piece 250 that is fabricated in a wafer kerf area 64, wherein a plug 254 of P1 pole material is formed beneath the test pole tip 250. It is therefore to be understood that the test pole tip 250 is generally similar to the test pole tip 188 depicted in FIG. 9 and described hereabove. Furthermore, and with reference to FIGS. 10 and 11, and the description provided hereabove with regard to the fabrication of the test artifact 196, it is to be understood that through the implementation of the fabrication steps described hereabove with regard to pole tip 188, that the same fabrication steps applied to the test pole tip 250 will result in the fabrication of the high contrast test artifact similar to the test artifact 196, as depicted in FIG. 11. Thus, the utilization of the test pole tip 250 will result in a test artifact that provides an accurate indication of the P2W width of magnetic heads 200 that are fabricated utilizing separate P2 pole pieces 202 together with test artifacts 250 having plugs 254 of P1 pole material fabricated therebelow.

It is therefore to be understood that the P2W width measurement method of the present invention is efficient and cost-effective. It introduces no new significant process or fabrication steps in the manufacturing of the magnetic heads. Rather, it simply requires that the photomasks be altered, such that a test device is fabricated in the kerf space of the wafer. The principal photomask that requires alteration is the P2 pole photomask, such that a test pole electroplating trench is developed in the photoresist above the seed layer in the test pole structure kerf location. Thereafter, when the P2 pole of the magnetic head is plated, the test pole structure is also plated. The seed layer is removed and P1 pole notching is conducted to provide reduction of side writing which increases track resolution. Then, when the chemical field etch step is conducted to remove unwanted excess metal, the test pole structure is completely removed, such that the test artifact, that is, the write gap layer beneath the test pole tip (and perhaps another layer portion depending upon the particular fabrication process) remains for subsequent SEM testing to determine its width w as an accurate indication of the P2W width.

While the present invention has been shown and described with regard to certain preferred embodiments, it is to be understood that those skilled in the art will no doubt develop certain alterations and modifications in form and detail that nevertheless include the true spirit and scope of the invention. It is therefore intended that the following claims cover all such alterations and modifications that nevertheless include the true spirit and scope of the invention.

What is claimed is:

1. A method for fabricating magnetic heads, comprising the steps of:
   fabricating a plurality of magnetic heads upon the surface of a substrate, said substrate including a field area disposed between said magnetic heads;
   fabricating at least one test device structure upon said substrate in said field area, said test device structure being formed in fabrication steps that are undertaken to fabricate said magnetic heads; wherein said test device structure includes a test artifact that is representative of a characteristic of said magnetic heads.

2. A method for fabricating magnetic heads as described in claim 1 wherein a plurality of test device structures are formed on the surface of said substrate.

3. A method for fabricating magnetic heads as described in claim 1 wherein said field area corresponds to an area of said substrate that is saw cut when said plurality of magnetic heads are separated.

4. A method for fabricating magnetic heads as described in claim 1 wherein said characteristic of said magnetic heads is the width of the base of a P2 pole tip (P2W) of said magnetic heads.

5. A method for fabricating magnetic heads as described in claim 4 wherein said test artifact includes a portion of a write gap forming material.

6. A method for fabricating magnetic heads as described in claim 5 wherein said write gap material is deposited upon said substrate surface.

7. A method for fabricating magnetic heads as described in claim 5 wherein said write gap material is electroplated upon said substrate surface.

8. A method for fabricating magnetic heads as described in claim 5 wherein said write gap material is fabricated upon a plug of P1 pole material.

9. A method for fabricating magnetic heads as described in claim 4 wherein said step of fabricating said magnetic heads includes the steps of fabricating a second magnetic pole (P2 pole) thereof, including a P2 pole tip with a P2 pole tip base having a width (P2W); and
   wherein said step of fabricating said test artifact includes the steps of fabricating a test pole structure including a test structure pole tip having a test pole tip base having a width w; and
   wherein said test pole tip base width w is approximately equal to P2W.

10. A method for fabricating magnetic heads as described in claim 9, wherein said steps of fabricating said P2 pole and said test artifact include the step of applying a photoresist to said substrate surface and photolithographically patterning said photoresist to form both said P2 pole and said test pole structure.

11. A method for fabricating magnetic heads as described in claim 10, wherein said step of photographically patterning said photoresist includes the further steps of utilizing a single photolithographic mask that includes resist photoexposure areas for both said P2 pole and said test pole structure.

12. A method for fabricating magnetic heads as described in claim 9 wherein said step of fabricating said test artifact includes the further step of etching away said test pole structure.

13. A method for fabricating magnetic heads as described in claim 12 wherein said step of etching away said test pole structure is performed during a field etch step undertaken during the fabrication of said magnetic heads.

14. A method for fabricating magnetic heads as described in claim 12 further including a P1 notching step of removing write gap material disposed alongside said test pole tip while not removing write gap material disposed beneath said test pole tip.

15. A method for fabricating magnetic heads as described in claim 12 wherein said step of etching away said test pole structure is performed without etching away write gap material that is disposed beneath said test pole tip.

16. A method for determining a characteristic of a magnetic head during the fabrication thereof, comprising the steps of:
   fabricating a plurality of magnetic heads upon the surface of a substrate, said substrate including a field area disposed between said magnetic heads;
   fabricating at least one test structure upon said substrate in said field area, said test structure being formed in fabrication steps that are undertaken to fabricate said magnetic heads; wherein said test structure includes a test artifact that is representative of a characteristic of said magnetic heads; and
   measuring said test artifact as a determination of said characteristic of said magnetic head.

17. A method for determining a characteristic of a magnetic head during the fabrication thereof, as described in claim 16 wherein a plurality of test structures are formed on the surface of said substrate.

18. A method for determining a characteristic of a magnetic head during the fabrication thereof, as described in claim 17 wherein said test artifact includes a portion of a write gap forming material.

19. A method for determining a characteristic of a magnetic head during the fabrication thereof, as described in claim 18 wherein said write gap material is deposited upon said substrate surface.

20. A method for determining a characteristic of a magnetic head during the fabrication thereof, as described in claim 18 wherein said write gap material is electroplated upon said substrate surface.

21. A method for determining a characteristic of a magnetic head during the fabrication thereof, as described in claim 18 wherein said write gap material is fabricated upon a plug of P1 pole material.

22. A method for determining a characteristic of a magnetic head during the fabrication thereof, as described in claim 16 wherein said field area corresponds to an area of said substrate that is saw cut when said plurality of magnetic heads are separated.

23. A method for determining a characteristic of a magnetic head during the fabrication thereof, as described in claim 16 wherein said characteristic of said magnetic heads is the width of the base of a P2 pole tip (P2W) of said magnetic heads.

24. A method for determining a characteristic of a magnetic head during the fabrication thereof, as described in claim 23 wherein said step of fabricating said magnetic heads includes the steps of fabricating a second magnetic pole (P2 pole) thereof, including a P2 pole tip with a P2 pole tip base having a width (P2W); and wherein said step of fabricating said test artifact includes the steps of fabricating g a test pole structure including a test pole tip having a test pole tip base having a width w; and wherein said test pole tip base width w is approximately equal to P2W.

25. A method for determining a characteristic of a magnetic head during the fabrication thereof, as described in claim 24, wherein said steps of fabricating said P2 pole and said test artifact include the step of applying a photoresist to said substrate surface and photolithographically patterning said photoresist to form both said P2 pole and said test structure.

26. A method for determining a characteristic of a magnetic head during the fabrication thereof, as described in claim 25, wherein said step of photographically patterning said photoresist includes the further steps of utilizing a single photolithographic mask that includes resist exposure areas for both said P2 pole and said test pole structure.

27. A method for determining a characteristic of a magnetic head during the fabrication thereof, as described in claim 24 wherein said step of fabricating said test artifact includes the further step of etching away said test pole structure.

28. A method for determining a characteristic of a magnetic head during the fabrication thereof, as described in claim 27 wherein said step of etching away said test pole structure is performed during a field etch step undertaken during the fabrication of said magnetic heads.

29. A method for determining a characteristic of a magnetic head during the fabrication thereof, as described in claim 28 further including a P1 notching step of removing write gap material disposed alongside said test pole tip while not removing write gap material disposed beneath said test pole tip.

30. A method for determining a characteristic of a magnetic head during the fabrication thereof, as described in claim 27 wherein said step of etching away said test pole structure is performed without etching away write gap material that is disposed beneath said test pole tip.

31. A method for determining a characteristic of a magnetic head during the fabrication thereof, as described in claim 16 wherein a characteristic of said test artifact and said characteristic of said magnetic head are substantially identically formed, such that a measurement of said characteristic of said test artifact is substantially identical to a measurement of said characteristic of said magnetic head.

32. A wafer substrate utilized during the fabrication of magnetic heads, comprising:

a substrate surface;

a plurality of magnetic heads being fabricated upon said substrate surface, said magnetic heads having at least one magnetic head characteristic feature;

an area disposed upon said substrate surface between at least two said magnetic heads;

at least one test structure being fabricated in said area;

said test structure being fabricated to have a test structure characteristic feature that is substantially identical to said magnetic head characteristic feature.

33. A wafer substrate as described in claim 32 wherein said magnetic head characteristic feature is a P2 pole tip.

34. A wafer substrate as described in claim 33 wherein said P2 pole tip is fabricated to have a width (P2W) and wherein said test structure characteristic feature is fabricated to have a width w, and wherein w is approximately equal to P2W.

35. A wafer substrate as described in claim 34 wherein said test structure is fabricated in the same fabrication steps and conditions as said magnetic head.

36. A wafer substrate as described in claim 35 wherein said area in which said test structure is fabricated in a kerf area of said wafer substrate.

37. A magnetic head fabricated from a wafer substrate in a process comprising the steps of:

fabricating a plurality of magnetic heads upon the surface of a substrate, said substrate including a kerf area disposed between said magnetic heads;

fabricating at least one test device structure upon said substrate in said field area, said test device structure being formed in fabrication steps that are undertaken to fabricate said magnetic heads; wherein said test device structure includes a test artifact that is representative of the width of the base of a P2 pole tip (P2W) of said magnetic heads.

38. A magnetic head as described in claim 37 wherein said step of fabricating said magnetic heads includes the steps of fabricating a second magnetic pole (P2 pole) thereof, including a P2 pole tip with a P2 pole tip base having a width (P2W); and wherein said step of fabricating said test artifact includes the steps of fabricating a test pole structure including a test structure pole tip having a test pole tip base having a width w; and wherein said test pole tip base width w is approximately equal to P2W.

39. A magnetic head as described in claim 38, wherein said steps of fabricating said P2 pole and said test artifact include the step of applying a photoresist to said substrate surface and photolithographically patterning said photoresist to form both said P2 pole and said test pole structure.

40. A magnetic head as described in claim 39, wherein said step of photographically patterning said photoresist includes the further steps of utilizing a single photolithographic mask that includes resist photoexposure areas for both said P2 pole and said test pole structure.

41. A magnetic head as described in claim 40 wherein said step of fabricating said test artifact includes the further step of etching away said test pole structure.

42. A magnetic head as described in claim 41 wherein said step of etching away said test pole structure is performed during a field etch step undertaken during the fabrication of said magnetic heads.

43. A magnetic head as described in claim 42 further including a P1 notching step of removing write gap material disposed alongside said test pole tip while not removing write gap material disposed beneath said test pole tip.

44. A magnetic head as described in claim 43 wherein said test artifact includes a portion of a write gap forming material.

45. A magnetic head as described in claim 44 wherein said write gap material is electroplated upon said substrate surface.

46. A magnetic head as described in claim 37 wherein said write gap material is fabricated upon a plug of P1 pole material.

* * * * *